Dec. 3, 1935.  M. E. SAMUEL  2,022,828
MOLDING PAN
Filed June 8, 1935
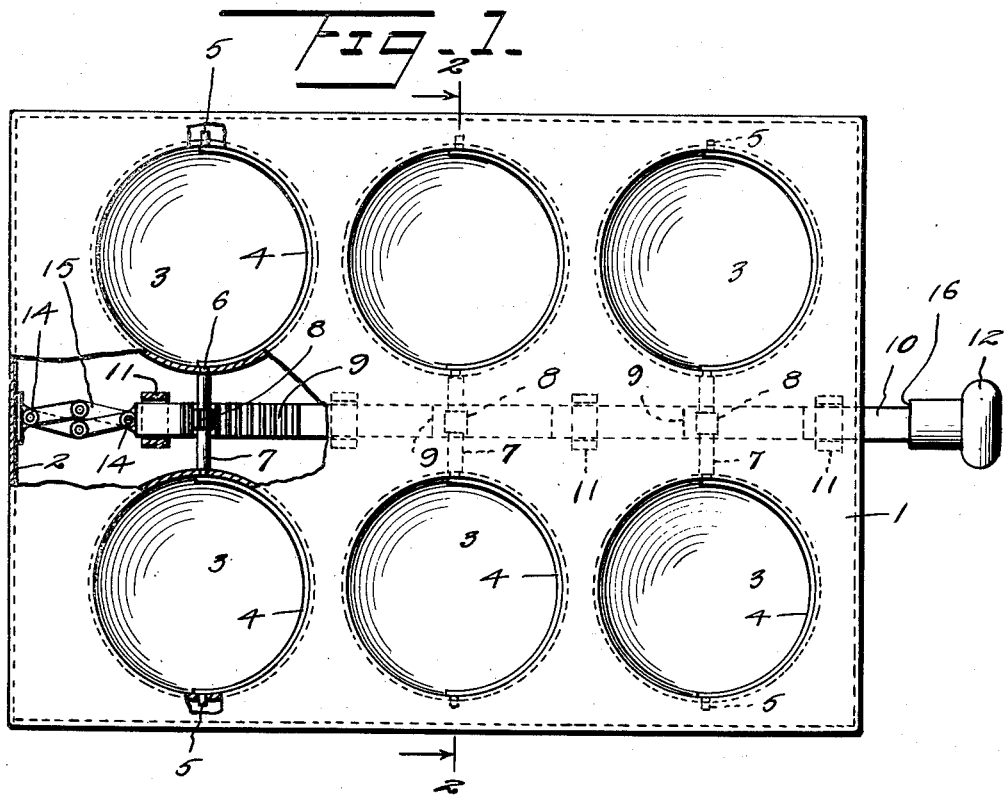
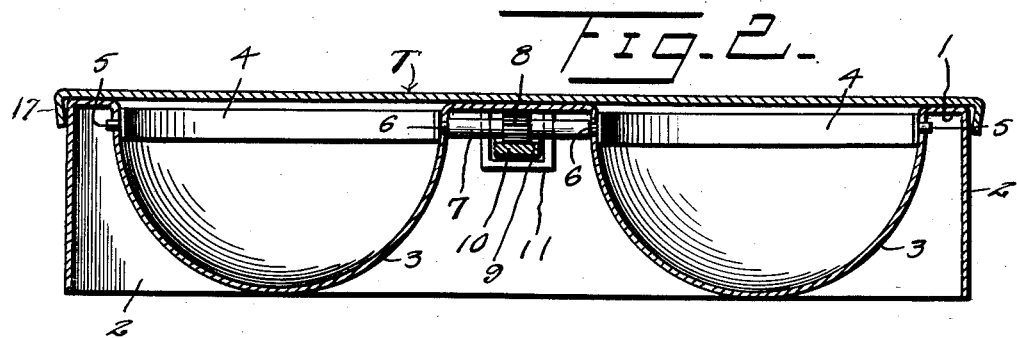
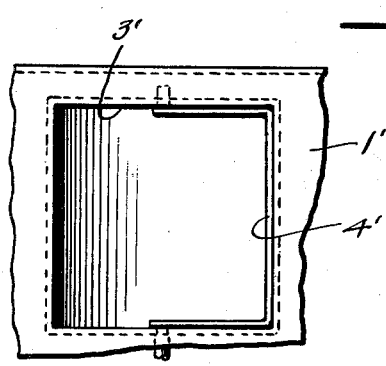
Inventor
M. E. Samuel
By Watson E. Coleman
Attorney Patented Dec. 3, 1935

2,022,828

UNITED STATES PATENT OFFICE 2,022,828

MOLDING PAN

Mary Evelynne Samuel, Martins Ferry, Ohio

Application June 8, 1935, Serial No. 25,658

6 Claims. (Cl. 107—19)

This invention relates to a molding pan and it is an object of the invention to provide a device of this kind which may be employed to advantage in the production of individual moldings of salads or other foods such as cookies, and which can also be employed to advantage as a baking pan.

It is also an object of the invention to provide a pan of this kind comprising a plurality of depressions or cups to receive the desired food batches to be molded together with means working in unison in said cups or depressions to facilitate the release or removal of the food batches after molding.

The invention consists in the details of construction and in the combination and arrangement of the several parts of my improved molding pan whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in top plan of a molding pan constructed in accordance with an embodiment of my invention, a portion being broken away and certain of the parts being indicated by broken lines;

Figure 2 is a transverse sectional view taken substantially on the line 2—2 of Figure 1;

Figure 3 is a fragmentary view in top plan illustrating a modified form of the invention.

As particularly illustrated in Figures 1 and 2, my improved pan comprises a top plate 1 of desired dimensions and material and which has its margins defined by the depending flanges 2.

In the present embodiment of my invention the plate 1 is rectangular in form and is provided therealong at opposite sides of its transverse center with the depressions or cups 3 arranged in series of three. Of course, the number of depressions or cups 3 in each of the series may be as preferred or desired and, therefore, I do not wish to be understood as limiting myself to a series of three. Each of these depressions or cups 3 is substantially semi-spherical in form although they may be of other designs or configurations. For example, as illustrated in Figure 3, the depression or cup 3' in the plate 1' is square in plan with its side walls straight.

Working within each of the cups or depressions 3 is an arcuate scraper blade 4 disposed on a curvature of substantially the same radius as the interior face of the depression or cup 3 so that said scraper blade 4 throughout its length will be closely adjacent to said inner face of the depression or cup 3. The extremities of the scraper blade 4 are provided with the outwardly and laterally directed trunnions 5 and 6 which are disposed through the wall of the depression or cup 3 below but closely adjacent to the plate 1, the mountings of the trunnions 5 and 6 with respect to the wall of the depression or cup 3 being such to assure the scraper blade 4 having swinging movement in a direction lengthwise of the plate 1 and at all times closely adjacent to the inner face of the depression or cup 3 so that upon rocking movement of the scraper blade 4 separation is assured of the food batch molded within the depression or cup 3 whereby a ready release or removal of the molded batch is assured either by lifting of the molded material or upon inversion of the pan.

Each of the depressions or cups 3 of one series is in transverse alignment with a depression or cup of the second series with the trunnions 5 and 6 of the scraper blades 4 of such transversely aligned depressions or cups 3 also in alignment. The inner trunnions 6 are tied or connected by an interposed shaft 7 carrying a pinion 8. This pinion 8 meshes with a rack 9 extending along a face of an elongated rod 10.

As herein disclosed, this rod 10 is of a flattened type and is supported in desired working position by the U-brackets 11 depending from the pan at a point substantially midway between the two series of depressions or cups 3. By endwise movement of the rod 10 all of the scraper blades 4 will be caused to have desired rocking movement.

When the rod 10 is at the limit of its movement in one direction the blades 4 will be in position substantially coplanar with the plate 1 to one side of the trunnions 5 and 6 and when the rod 10 is at the limit of its movement in the opposite direction said blades 4 will be in a similar position with respect to the plate 1 only at the opposite side of the trunnions 5 and 6.

The rod 10 is of a length to be directed through and beyond one of the flanges 2 and the outer end portion of the rod 10 carries a knob or hand grasp 12 to facilitate the desired endwise movement of the rod. Interposed between and secured to the inner end of the rod 10 and the opposed flange 2 of the plate 1, as indicated at 14, is a toggle 15. This toggle 15 serves to limit the extent of outward movement of the rod 10 but offers no hinderance or obstruction to the desired inward movement of the rod 10. This inward movement of the rod 10 may be determined when the toggle 15 is fully open or by contact of the shoulder 16 at the inner portion of the knob or hand grasp 12 with the adjacent flange 2 of the plate 1.

Working in the depression or cup 3' as illustrated in Figure 3 is a scraper blade 4', the same being operated in the same manner as the blades 4. This scraper blade 4', however, is so formed or designed to closely approach the side and bottom walls of the depression or cup 3' or, in other words, this blade 4' is substantially U-shaped in form.

While my improved pan as herein disclosed is primarily intended for molding batches of food such as salads or the like, it is believed to be clearly apparent that the same can also be employed to advantage as a bake pan.

As illustrated in Figure 2, a tray top T is to be fitted upon the top of the pan, said top is of a size and configuration conforming to the general outline of the pan and the side or longitudinal margins of this top T are provided with the depending flanges 17 formed in a manner to have frictional contact with the adjacent side flanges 2 of the pan whereby the top is effectively held in place yet can be easily slid on or off the pan.

The applied tray top T has close contact with the upper surface of the plate 1 of the pan to keep intact the contents of the depression or cups 3 upon inversion of the pan. To release the contents the tray top is slid along the pan so that as the contents are released from one pair of transversely aligned depressions or cups 3 the contents of the remaining depressions or cups are protected.

From the foregoing description it is thought to be obvious that a molding pan constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A pan of the character described comprising a plate having depending marginal flanges and also having depressions therein constituting molding cups, scraper blades supported within said cups for swinging movement about axes radial to the open faces of the cups and closely approaching the walls of the cups, and means for rocking the blades in unison.

2. A pan of the class described comprising a plate having depressions constituting molding cups, said cups being arranged in a plurality of series with each cup of one series transversely aligned with a cup of the second series, a movable member supported by the plate therebelow and between the series of cups, scraper blades mounted within the cups for rocking movement about axes radial to the open faces of the cups, and coacting means carried by the blades and the movable member for rocking the blades within the cups upon movement of the movable member.

3. A pan of the class described comprising a plate having depressions constituting molding cups, said cups being arranged in a plurality of series with each cup of one series transversely aligned with a cup of the second series, a movable member supported by the plate therebelow and between the series of cups, scraper blades mounted within the cups for rocking movement, coacting means carried by the blades and the movable member for rocking the blades within the cups upon movement of the movable member, and means for limiting the extent of movement of the movable member, the scraper blades being in a plane substantially parallel to the plane of the plate when the movable member is at the limit of its movement.

4. A pan of the class described comprising a plate having depressions forming molding cups, scraper blades supported within said cups for rocking movement, an endwise movable rod below the plate and supported thereby, and coacting means carried by the scraper blades and the rod for rocking the blades upon endwise movement of the rod in either direction.

5. A pan of the class described comprising a plate having depressions forming molding cups, scraper blades supported within said cups for rocking movement, an endwise movable rod below the plate and supported thereby, coacting means carried by the scraper blades and the rod for rocking the blades upon endwise movement of the rod in either direction, and means for limiting the endwise movement of the rod.

6. A pan of the class described comprising a plate having depressions forming molding cups, scraper blades supported within said cups for rocking movement, an endwise movable rod below the plate and supported thereby, coacting means carried by the scraper blades and the rod for rocking the blades upon endwise movement of the rod in either direction, said pan having depending marginal flanges, the rod extending beyond the pan through one of said flanges, and coacting means carried by the inner end of the rod and one of the flanges of the pan for limiting the endwise movement of the rod.

MARY EVELYNNE SAMUEL.